(12) United States Patent
O'Shea et al.

(10) Patent No.: US 8,156,220 B1
(45) Date of Patent: Apr. 10, 2012

(54) DATA STORAGE SYSTEM

(75) Inventors: John O'Shea, Newton, MA (US);
Jeffrey Kinne, Needham, MA (US);
Michael Sgrosso, Franklin, MA (US);
William F. Baxter, III, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 387 days.

(21) Appl. No.: 11/863,530

(22) Filed: Sep. 28, 2007

(51) Int. Cl.
*G06F 15/173* (2006.01)
*G06F 13/00* (2006.01)
*G06F 11/00* (2006.01)

(52) U.S. Cl. ........ 709/224; 709/223; 709/225; 710/316; 714/1; 714/18

(58) Field of Classification Search ................. 709/224; 710/316; 714/1, 18
See application file for complete search history.

(56) References Cited

U.S. PATENT DOCUMENTS

| | | | | |
|---|---|---|---|---|
| 5,890,207 | A * | 3/1999 | Sne et al. ................... | 711/113 |
| 6,675,253 | B1 * | 1/2004 | Brinkmann et al. .......... | 710/316 |
| 6,889,301 | B1 * | 5/2005 | Wilson et al. ................ | 711/169 |
| 7,032,028 | B2 * | 4/2006 | Clay et al. ................... | 709/238 |
| 7,209,972 | B1 | 4/2007 | Ignatius et al. | |
| 2002/0073062 | A1 * | 6/2002 | Cerami et al. ............... | 707/1 |
| 2002/0144038 | A1 * | 10/2002 | Smith ......................... | 710/240 |
| 2003/0123475 | A1 * | 7/2003 | Smyers ....................... | 370/451 |
| 2004/0123013 | A1 * | 6/2004 | Clayton et al. .............. | 710/310 |
| 2004/0172636 | A1 * | 9/2004 | Do et al. ..................... | 719/321 |
| 2005/0010702 | A1 * | 1/2005 | Saito et al. .................. | 710/52 |
| 2005/0071424 | A1 * | 3/2005 | Baxter, III .................. | 709/203 |
| 2006/0005061 | A1 * | 1/2006 | Seto ............................ | 714/1 |

OTHER PUBLICATIONS

U.S. Appl. No. 11/769,744, filed Jun. 28, 2007.
U.S. Appl. No. 11/769,747, filed Jun. 28, 2007.
U.S. Appl. No. 11/769,739, filed Jun. 28, 2007.
U.S. Appl. No. 11/769,737, filed Jun. 28, 2007.
U.S. Appl. No. 11/769,746, filed Jun. 28, 2007.
U.S. Appl. No. 11/769,743, filed Jun. 28, 2007.
U.S. Appl. No. 11/769,741, filed Jun. 28, 2007.
U.S. Appl. No. 11/769,740, filed Jun. 28, 2007.
U.S. Appl. No. 11/769,745, filed Jun. 28, 2007.

* cited by examiner

*Primary Examiner* — Kevin Bates
*Assistant Examiner* — Mohammed Ahmed

(57) ABSTRACT

A method is provided for transmitting user data from a selected one of a plurality of data pipes. The method includes having a ring manager select one of the data pipes from a pool of the data pipes for transmission of the user data. The data is transmitted from the selected one of the data pipes at least one packet switching network. The data pipe detects whether there was an error in the transmission. If there an error detected, the data pipe generates an error interrupt for the ring manager. The ring manager detects the error interrupt and generates an error interrupt for a CPU. The ring manager removes the selected one of the data pipes from the pool of data pipes for a predetermined period of time while the ring manager continues to work on other tasks until the time has expired. During pipe retirement, the physical pipe removed from the pool of pipes is disabled and the router will then direct orphan packets to the error ring. When the time has expired, the ring manager returns the selected data pipe to the pool of available data pipes.

5 Claims, 7 Drawing Sheets

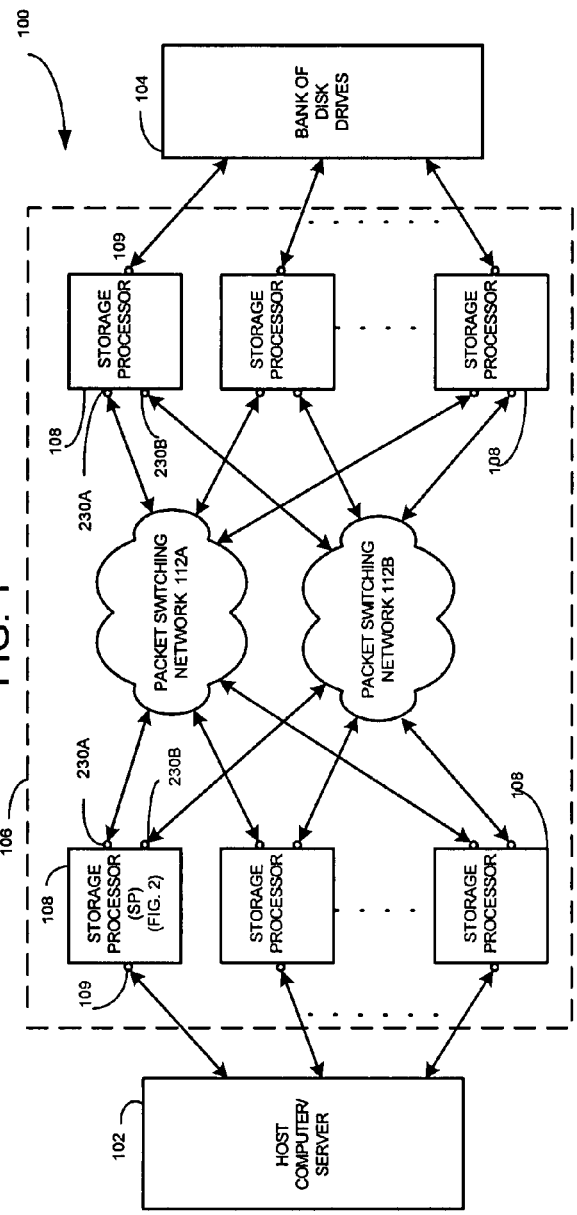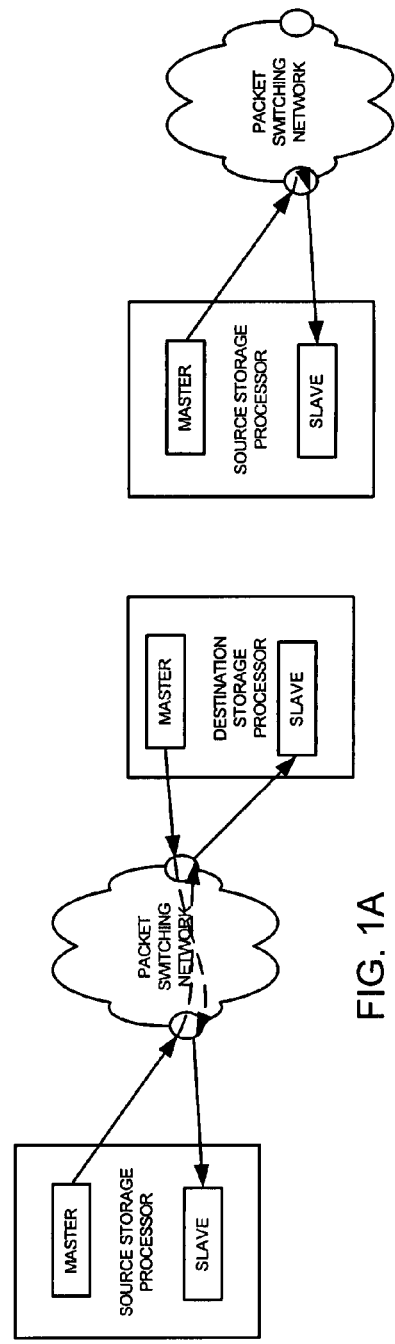

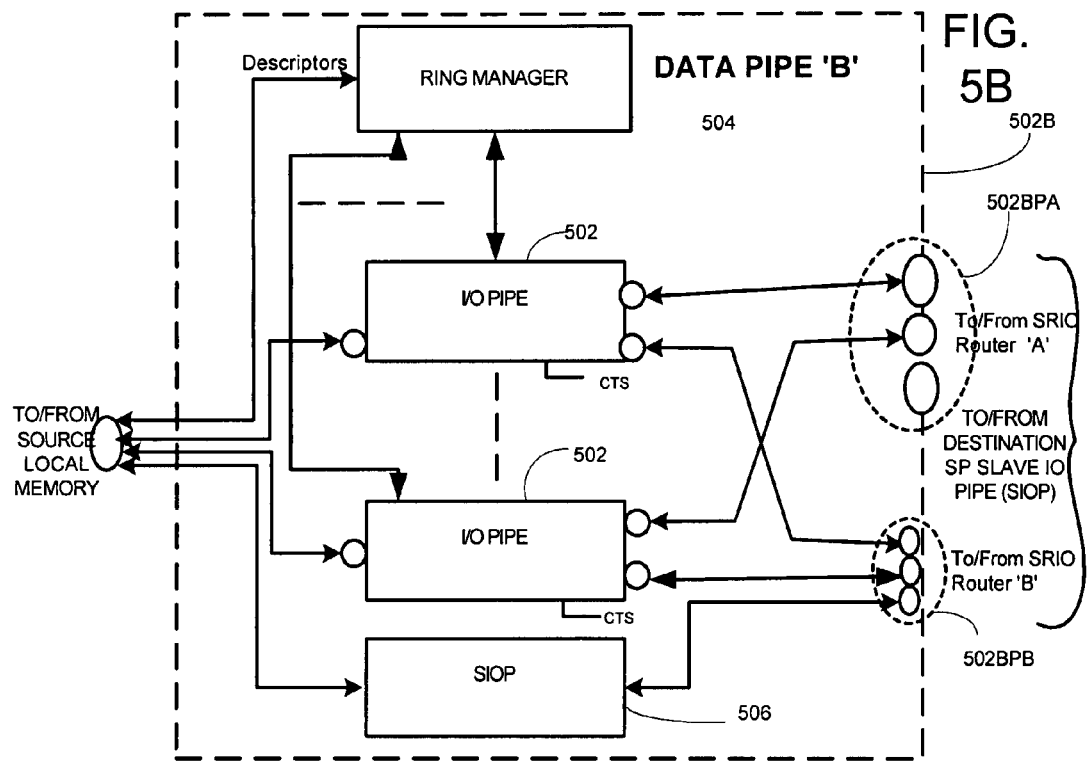

DATA STORAGE SYSTEM

INCORPORATION BY REFERENCE

This application is related to and incorporates by reference the entire subject matter of U.S. patent application Ser. No. 11/769,744 filed Jun. 28, 2007 entitled DATA STORAGE SYSTEM HAVING PLURAL DATA PIPES, inventor Jeffrey Kinne et al.

TECHNICAL FIELD

This invention relates generally to data storage systems and more particularly to data storage systems having a host computer/server coupled to a bank of disk drives through a system interface.

BACKGROUND AND SUMMARY

As is known in the art, large host computers and servers (collectively referred to herein as "host computer/servers") require large capacity data storage systems. These large computer/servers generally include data processors, which perform many operations on data introduced to the host computer/server through peripherals including the data storage system. The results of these operations are output to peripherals, including the storage system.

One type of data storage system is a magnetic disk storage system having a bank of disk drives. The bank of disk drives and the host computer/server are coupled together through a system interface. The interface includes "front end" or host computer/server controllers (or storage processors) and "back-end" or disk controllers (or storage processors). The interface operates the storage processors in such a way that they are transparent to the host computer/server. That is, user data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. patent, the interface may also include, in addition to the host computer/server storage processors and disk storage processors, a user data semiconductor global cache memory accessible by all the storage processors. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data. As described in U.S. Pat. No. 7,136, 959 entitled "Data Storage System Having Crossbar Packet Switching Network", issued Nov. 14, 2006, inventor William F. Baxter III, assigned to the same assignee as the present invention, the global cache memory may be distributed among the service processors.

As is also known in the art, it is desirable to maximize user data transfer through the interface including maximized packet transfer through the packet switching network. In fabric based storage system where DMA data pipes are used to facilitate data movement between fabric nodes, there needs to be mechanisms in place to handle fabric congestion and in severe cases handle events as a result of a failed fabric node. In PCI-E/SRIO bridge ASIC, the fabric in question is SRIO, but the method is protocol agnostic.

As described in the above-identified pending U.S. patent application Ser. No. 11/769,744 there are eight parallel DMA data pipes within the PCI-E/SRIO bridge ASIC. A ring manager (i.e., a controller) controls the data pipes. Each DMA data pipe can post a number of sequential requests to the fabric (from 1-8) and since eight IO's (i.e., data transfers) can be active at once, this allows for up to 64 read requests to be outstanding. Up to 64 write requests can be outstanding per fabric if mirroring is enabled on all pipes.

Normally, when a packet request is launched from a data pipe a packet response including Sequence ID is returned from the receiving node back to the data pipe which initiated the request. In the event of fabric error or failure, the data pipe encounters a fatal error and the data pipe generates an error interrupt to the Ring Manager before shutting off.

Typically when the ring manager generates a response descriptor for a known good IO (i.e., data transfer), it frees the data pipe for next request descriptor. In the case of an error, the ring manager generates the appropriate error responses and places them on the response ring. In this case, because of the fabric errors, it not safe to free up the data pipe. Because of the error fabric congestion and backlog may initially exist but then free up. There is a window of time, where it is possible for rogue RIO packets to return to data pipe after the fatal error occurs. If the data pipe has been re-used for a new IO by the ring manager during this time, rogue errors will occur and corrupt the data transfer. The method used here to graceful recovery is to retire the pipe for a period of time to mask out potential rogue errors coming back from the fabric. This mechanism implemented is called Pipe Retirement. During Pipe Retirement, it is expected that all outstanding Sequence IDs will be returned to data pipe and will be matched with Sequence IDs stored in its local buffer at request time. Once Pipe Retirement expires it is expected that Rogue packets will be returned to the data pipe. The ring manager will not use the pipe until pipe retirement time expires. A pipe retirement time is selectable by programming a Pipe Retirement Seed register. The Pipe retirement number should be set to ~10× the RIO Response timeout value.

Thus, in accordance with the invention, a method is provided for transmitting user data from a selected one of a plurality of data pipes. The method includes: selecting under control of a controller, one of the data pipes from a pool of the data pipes for transmission of the user data; transmitting from the selected one of the data pipes the user data; detecting whether there was an error in the transmission; if there an error detected, generates in the selected one of the data pipes an error interrupt for the controller; removing, under control of the controller, the selected one of the data pipes from the pool of data pipes for a predetermined period of time and when the time has expired, having the controller return the selected data pipe to the pool of available data pipes.

In one embodiment, the method includes having a ring manager select one of the data pipes from a pool of the data pipes for transmission of the user data. The data is transmitted from the selected one of the data pipes at least one packet switching network. The data pipe detects whether there was an error in the transmission. If there an error detected, the data pipe generates an error interrupt for the ring manager. The ring manager detects the error interrupt and generates an error interrupt for a CPU. The ring manager removes the selected one of the data pipes from the pool of data pipes for a predetermined period of time while the ring manager continues to work on other tasks until the time has expired. When the time has expired, the ring manager returns the selected data pipe to the pool of available data pipes.

In one embodiment, a method is provided for controlling user data transmission data between a host computer/server and a bank of disk drives through a system interface, such system interface having: a plurality of storage processors, one portion of the storage processors having a user data port coupled to the host computer/server and another portion of the storage processors having a user data port coupled to the bank of disk drives; and, a packet switching network coupled to the plurality of storage processors for passing packets between the plurality storage processors, each one of the plurality of storage processors comprising: a CPU section; a data pipe section coupled between the user data port and the packet switching network, such data pipe section comprising: a plurality of data pipes, and a data pipe controller responsive to descriptors produced by the CPU section for controlling the plurality of data pipes, user data at the user data port passing through the data pipes, each one of the plurality of data pipes comprising a pool of available data pipes controlled by the ring manager. The method includes: selecting, under control of the ring manager, one of the data pipes from the pool of data pipes for transmission of the user data; transmitting the user data from the selected one of the data pipes; detecting in the selected one of the data pipes whether there was an error in the transmission; if there an error detected, generating in the selected one of the data pipes an error interrupt for the ring manager; detecting in the ring managers the error interrupt and generating in the ring manager an error interrupt for the CPU; removing, under control of the ring manager, the selected one of the data pipes from the pool of data pipes for a predetermined period of time while the ring manager continues to work on other tasks until the time has expired; when the time has expired, returning, under control of the ring manager, the selected data pipes to the pool of available data pipes.

In one embodiment, when the ring manager detects the error interrupt the ring manger generates an error interrupt for the CPU.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a diagram of a data storage system having an interface coupled between a host computer/server and a bank of disk drives, such interface having a plurality of storage processors (SPs), one portion of the SPs being coupled to the host computer/server and another portion of the SPs being coupled to the bank of disk drives, the plurality of SPs being interconnected through a pair of packet switching networks according to the invention;

FIG. 1A is a diagram showing master and slave portions of an exemplary pair of the SPs of FIG. 1 interconnected through one of the packet switching networks, one of the SPs being a source SP and the other being a destination SP;

FIG. 1B is a diagram showing master and slave portions of the same one of the SPs of FIG. 1 interconnected through one of the packet switching networks;

FIG. 5B is a block diagram of an exemplary the other one of a pair of data pipe groups used in the data pipe section of FIG. 5 according to the invention;

Like reference symbols in the various drawings indicate like elements.

DETAILED DESCRIPTION

Figure 2:
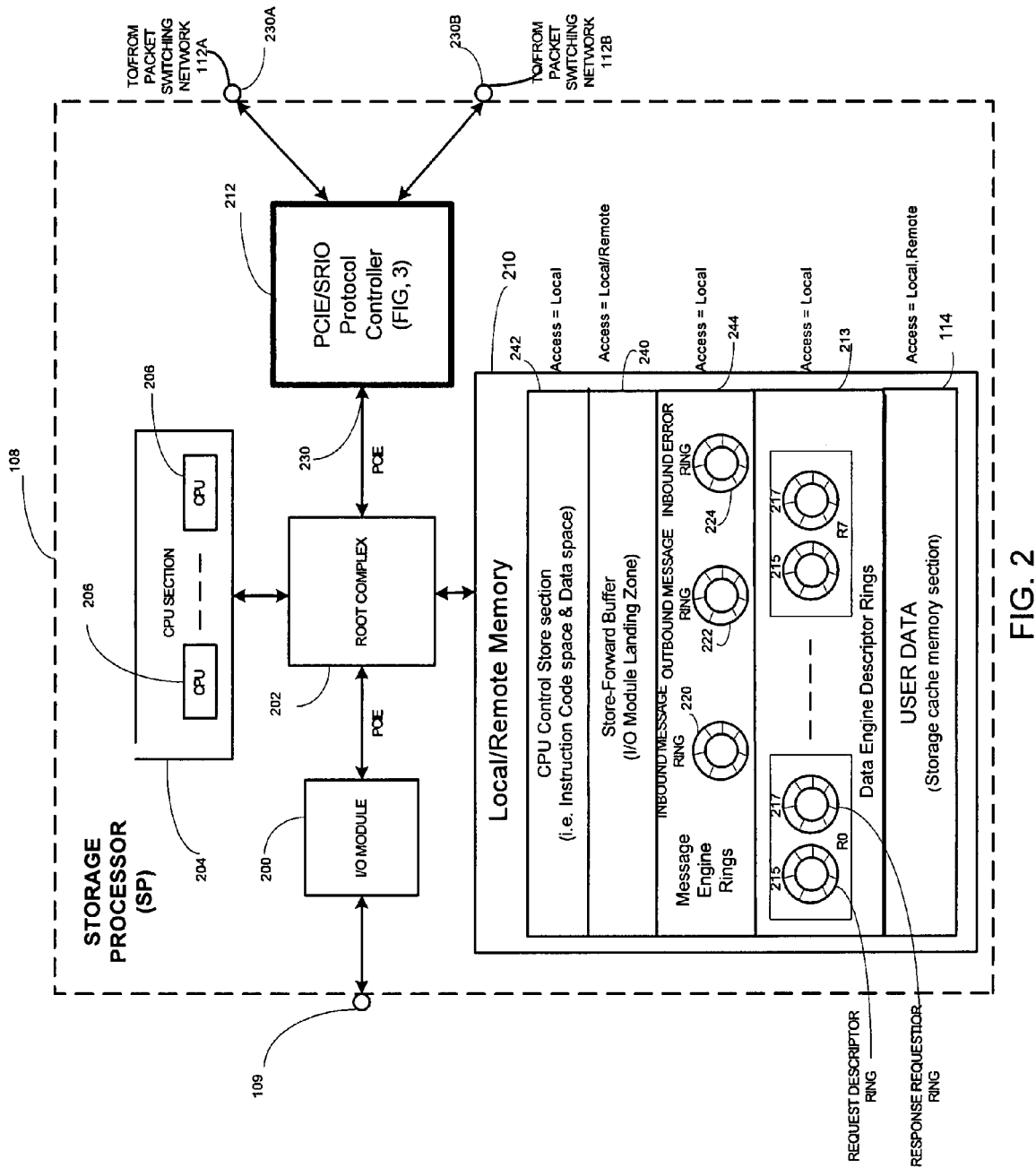
FIG. 2 is a block diagram of an exemplary one of a plurality of storage processors used in the data storage system of FIG. 1.

Referring now to FIG. 1 a data storage system 100 is shown having a host computer/server 102 coupled to a bank of disk drives 104 through a system interface 106. The system interface 106 includes front end storage processors (SPs) 108 connect to the host computer/server 102 and back end storage processors 108 connected to the bank of disk drives 104. Each one of the SPs 108 and 108 is identical in construction, an exemplary one thereof, here one of the front end SPs 108, being shown in more detail in FIG. 2.

The front end and back end storage processors 108 (FIG. 1) are interconnected through a pair of redundant packet switching networks 112A, 112B. Further, as will be described herein, a global cache memory 114 (FIG. 2) is made up of a plurality of global cache memory sections, each one of the global cache memory sections being distributed in a corresponding one of the front and back end storage processors 108.

The front-end and back-end storage processors 108 (FIG. 1) control the transfer of user data (sometimes referred to as host/server or customer data) between the host computer/server 102 and the bank of disk drives 104 through the packet switching networks 112A, 112B in response to messages passing between and/or among the storage processors 108 through the packet switching networks 112A, 112B. Here, the packet switching networks 112A, 112B transfer packets of user data, messages, maintenance packets and DSA transfers, described pending U.S. patent application Ser. No. 11/769,744, using a SRIO protocol.

As noted above, each one of the front end and back end storage processors 108 is identical in construction, an exemplary one thereof being shown in more detail in FIG. 2 to include an I/O module 200 connected via port 109 (FIGS. 1 and 2), in the case of a front end storage processor 108, to the host computer/server 102 and in the case of a back end storage processor 108 connected to the bank of disk drives 104, as indicated in FIG. 1.

The I/O module 200 (FIG. 2) is connected to a commercially available root complex 202, here, for example, an Intel root complex. Also connected to the root complex 202 is a CPU section 204 having a plurality of central processing units (CPUs) 206; a local/remote memory 210; and a PCIE/SRIO Protocol Controller 212, to be described in more detail in connection with FIG. 3. Suffice it to say here that the PCIE/

SRIO Protocol Controller 212, among other things, converts between the Serial Rapid Input/Output (SRIO) protocol used by the packet switching networks 112A, 112B, and the PCIE protocol used by the CPUs 206, and the I/O module 200. The PCIE/SRIO Protocol Controller 212 is connected to the root complex 202 via port 230 and is connected to pair of packet switching networks 112A, 112B (FIG. 1) via ports 230A, 230B, respectively, as indicated. The PCIE/SRIO Protocol Controller 212 is described in more detail in the above referenced U.S. patent application Ser. No. 11/769,744.

The local/remote memory 210 has: a section of a global cache memory 114 (i.e., a cache memory section) as described in the above referenced U.S. Pat. No. 7,126,959, for storing user data; a bank of plurality of descriptor rings 213, here for example 8 pairs of descriptor rings (one of the rings in a pair is a request ring 215 and the other one of the rings is a response ring 217); a message engine ring section 244 which contains inbound message ring 220 (FIG. 2); an outbound message ring 222 (FIG. 2); an error ring 224; a CPU control store section 242 which contains the CPU's instructions and data space; and a store-forward buffer which acts as a temporary buffer for user data from the 10 Module 200 before it is moved to global cache memory. Further, while the local/remote memory 210 will be described in more detail, it should first be noted that when the local/remote memory 210 stores in user data section 114 user data for it's own storage processor 108 it may be considered as "local" memory whereas when the local/remote memory is storing user data in section 114 for other ones of the storage processors 108 it may be considered as "remote" memory.

The local/remote attributes are shown to the right of local/remote memory 210 on FIG. 2. The areas of memory that are marked as 'local' can only be accessed by the local SP. Remote SP's are blocked from accessing these local data structures to reduce the chance of corruption.

The access protection mechanism is described later. Areas of memory that are labeled 'local/remote' can be accessed from the local SP or a remote SP over the packet switching network.

The data stored in local/remote memory 210 is also protected from accidental overwrite (and accidental data overlays). End-to-end protection of data from the host to disk in this case is managed with higher level data protections such as T10 standard DIF CRC protection (see INCITS: T10 Technical Committee on SCSI Storage Interfaces—Preliminary DIF (Block CRC) documents) which is supported in the PCIE/SRIO Protocol Controller 212, Data pipe section 500 (FIG. 3, described pending U.S. patent application Ser. No. 11/769,744). Unique LBA (logical block addresses) provide overlay protection while the DIF CRC provides for overwrite protection.

Figure 3:
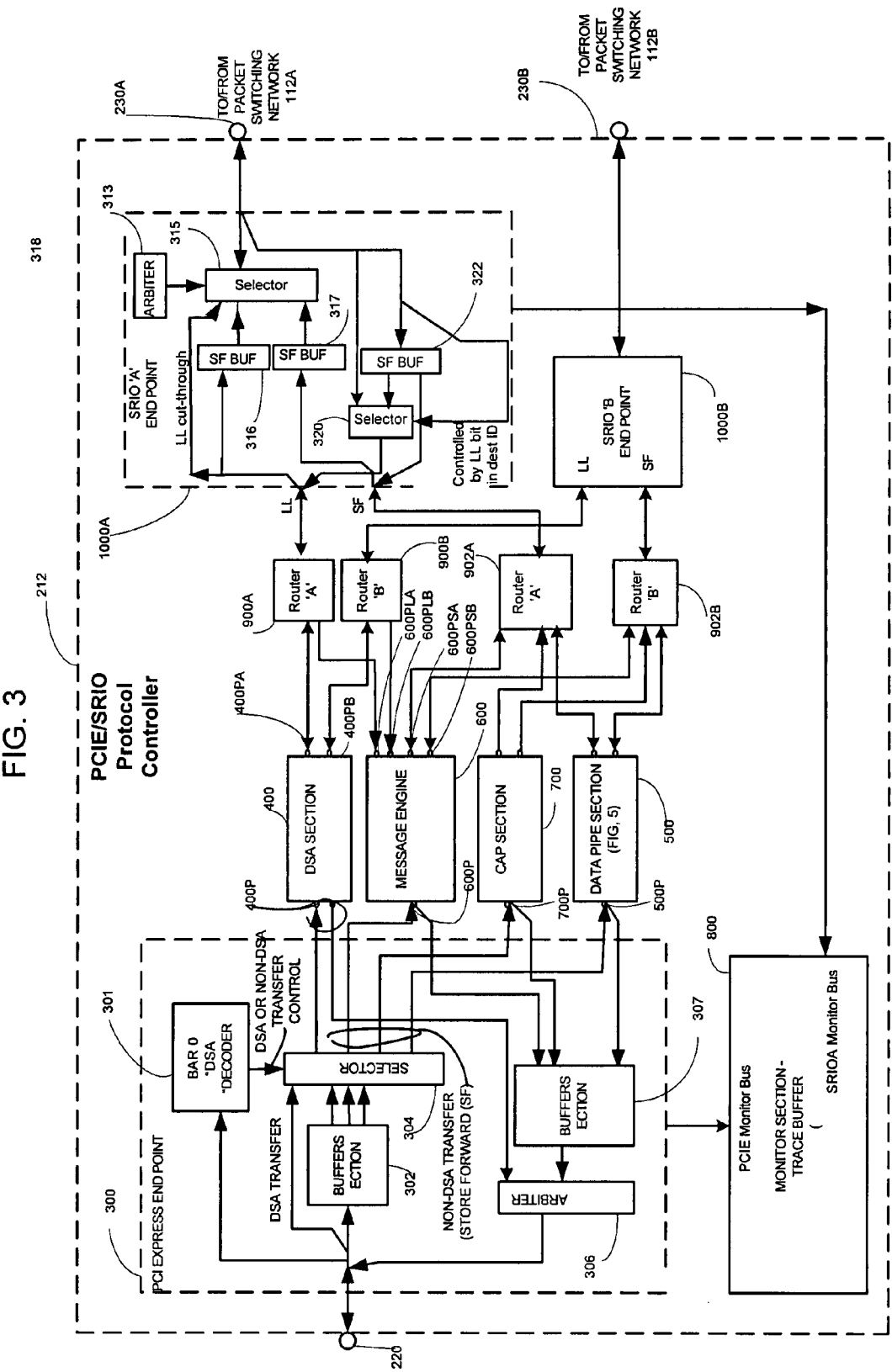
FIG. 3 is a block diagram of a PCIE/SRIO protocol controller used in the storage processor (SP) of FIG. 2 according to the invention.

Referring now to FIG. 3, the PCIE/SRIO Protocol Controller 212 is shown in more detail to include a PCIE Express (PCIE) endpoint 300 connected to the root complex 202 (FIG. 2) through port 220 for passing PCIE protocol information between the PCIE/SRIO Controller 212 and the root complex 202. Connected to the PCIE Express (PCIE) endpoint 300 are: a DSA section 400, described in more detail in the above referenced U.S. patent application Ser. No. 11/769,744; the data pipe section 500 described pending U.S. patent application Ser. No. 11/769,744, a message engine 600 described in more detail in the above referenced U.S. patent application Ser. No. 11/769,744; a CPU Access Port (CAP) section 700 described in more detail in the above referenced U.S. patent application Ser. No. 11/769,744 described in more detail in the above referenced U.S. patent application Ser. No. 11/769,744.

Referring to FIG. 3, the DSA section 400 is connected to: the first one of the pair of switching networks 112A via port 230A through an SRIO Router 900A and SRIO "A" end point 1000A; and the second one of the pair of switching networks 112B via port 230B through an SRIO Router 900B and SRIO "B" end point 1000B.

Similarly, the message engine 600 (FIG. 3) is connected to: the first one of the pair of switching networks 112A (FIG. 1) via port 230A through the SRIO Routers 900A, 902A and SRIO "A" end point 1000A, as shown in FIG. 3; and the second one of the pair of switching networks 112B via port 230B through the SRIO Router 900B, 902B and SRIO B end point 1000B.

The CAP section 700, and data pipe section 400 is connected to: the first one of the pair of switching networks 112A via port through the SRIO Router 902A and the SRIO A end point 1000A; and the second one of the pair of switching networks 112B via port 230B through the SRIO Router 902B and SRIO B end point 1000B.

Considering egress of packets to the packet switching networks, 112A, 112B, the LL port is connected directly to a selector 315 through a LL cut-through path, as indicated, and is also connected to the selector 315 through a store forward (SF) buffer 316, as shown. An arbiter 313 controls the operation of the selector 315. The arbiter 313 selects the LL cut-through path whenever the SF Buffer 316 is empty, and if the transmitter (TX) link (i.e., port 230A, 230B) is idle. If the TX link is not idle, then DSA packets are stored within store forward (SF) buffer 316. The output of the selector 315 is connected to the packet switching network 112A in the case of end point 1000A and packet switching network 112B in the case of end point 1000B, as indicated.

Considering ingress where packets are received from the packet switching networks 112A, 112B, such packets pass to a selector 320 directly and also to such selector 320 through a store forward (SF) buffers 322, as indicated. The selector 320 is controlled by the incoming packet (i.e., the destination ID field contains a low latency (LL), store-forward (SF) path select bit) to pass low latency incoming packets directly to the LL port bypassing SF buffer 322 and to pass store forward packets to the SF port after passing through the SF buffer 322. The ingress packet on the SF port then passes to SRIO Router A 902A or SRIO Router B 902B, as the case may be, and then to the message engine 600, or the data pipe section 500. The ingress packet on the LL port then passes to SRIO Router 900A or SRIO Router 900B, as the case may be, and then to the DSA Section 400.

As noted above, and referring again to FIG. 1, packets are transmitted between storage processors (SPs) 108 through a packet switching network 112A, 112B. Thus, the one of the SPs producing a request packet for transmission may be considered as a source SP 108 and the one of the SPs receiving the transmitted request packet may be considered as the destination SP 108, as shown in FIG. 1A. More particularly, when the request packet is transmitted from the source SP 108 requesting execution of such transmitted packet by the destination SP 108, the components in the source SP 108 are sometimes herein referred to as master components and the components in the destination SP 108 may be considered as a slave components, as shown in FIG. 1A. It is noted from FIG. 1A that any one of the SPs 108 may be acting for one packet as a source SP for that packet and may be acting for a different packet as a destination SP 108; in the former case, the components are master components and in the later the components are slave components. As shown in FIG. 1A, when a request packet is sent from one SP 108 to the network for execution by the same SP 108, during transmission of the packet the components are acting as master components and during receipt of the request packet, the components are acting as slave components. This same master/slave concept applies the data pipe section 500 (FIG. 5A) having data pipe groups 502A, 502B, a slave data pipe 506 (i.e., SIOP), described pending U.S. patent application Ser. No. 11/769,744, and here eight data pipes (I/O Pipes that may be considered as master data pipes) 502 in more detail in the above referenced U.S. patent application Ser. No. 11/769,744.

It might be noted here that there are two transfer planes: an I/O transfer plane wherein user data is transferred from the host computer/server 102 (FIG. 1) and the bank of disk drives 104 through the data pipe section 500 (FIG. 3) in the storage processors 108, 108; and a control plane wherein control information used to control the user data flow through the system interface 106 (FIG. 1). The control plane includes three types of transfers: (a) messaging for transferring control messages via the message engine 600 (FIG. 3) among the storage processors 108, such messages indicating, for example, the one or ones of a plurality of disk drives in the bank of disk drives is to store the user data; and (b) DSA (Direct Single Access) transfers controlled by the CPU; and (c) maintenance packets, for example, used to configured routing tables within the packet switching networks.

As noted above, message packet, user data packet and maintenance packet transfers from the local/remote memory 210 (FIG. 2) to the PCIE/SRIO protocol controller 212 are referred to as store forward (SF) transfers and transfers directly from the CPU 204 which by-pass the local/remote memory 210 are low latency or DSA transfers. A DSA transfer by-passes the data pipe section 500 and message engine 600 in both the source storage processor 108 and the destination storage processors 108 and passes, in effect, from the CPU 204 of the source storage processor 108, through a master DSA described in more detail in the above referenced U.S. patent application Ser. No. 11/769,744, through one of the two packet switching networks 112A, 112B (FIGS. 1, 5A) to a slave DSA described in more detail in the above referenced U.S. patent application Ser. No. 11/769,744, of the addressed one of the destination storage processors 108 without passing through the local/remote memory 210 of the source storage processor 108. The slave DSA at the destination storage processors 108 controls the operation of the specified atomic operation requested by the source storage processor 108 and reports the status of the atomic operation back through the packet switching network to the master DSA of the source storage processor 108. The master DSA of the source storage processor 108 then passes the status of the DSA transfer into the local/remote memory 210 of the source storage processor 108. Finally, the master DSA of the source storage processor 108 sends a completion interrupt to the CPU 204 of the source storage processor 108.

The DSA section 400 is used for low latency transfers of, for example, atomic operations. For the case of no congestion, a DSA can efficiently bypass several store-forward packet buffers to be described in more detail described in the above referenced U.S. patent application Ser. No. 11/769,744 which reduces latency significantly. For example in a typical store-forward implementation, a packet is completely stored and error checked before being "forwarded" to the upstream module. Typically, a SF buffer consumes two clocks (one associated with loading the buffer, one for unloading) for every "word" transferred. The penalty for bypassing a SF packet buffer is that the upstream module can receive errant packets that may contain, for example, CRC link errors. In conventional packet switched designs, errant packets are dropped (and retried) and the upstream modules only receive error free packets. Additional complexity is needed when bypassing SF buffers since now the upstream logic must drop the packet (but the retry is still done at the physical link layer). DSA transfers are described in U.S. Pat. No. 6,594,739 entitled "Memory System and Method of Using Same", inventors Walton et al., issued Jul. 15, 2003; U.S. Pat. No. 6,578,126, entitled "Memory System and Method of Using Same", inventors MacLellan et al., issued Jun. 10, 2003; and entitled "Memory System and Method of Using Same", inventors Walton et al., issued Apr. 19, 2005 all assigned to the same assignee as the present invention, the subject matter thereof being incorporated herein by reference.

As noted above, the message engine 600 passes messages generated by the CPU section 204 (FIG. 1) in one of the storage processors (SPs) 108 to one or more of the storage processors SPs 108 via either one of the packet switching networks 112A, 112B (FIG. 1) to facilitate control of the user data passing between the bank of disk drives 104 (FIG. 1) and the host computer/server 102 via the system interface 106; more particularly, as the user data passes through the data pipe sections 502A, 502B (FIG. 5) of the front and back end storage processor 108 (FIG. 1) via one or both of the packet switching networks 112A, 112B (FIG. 1).

Figure 5:
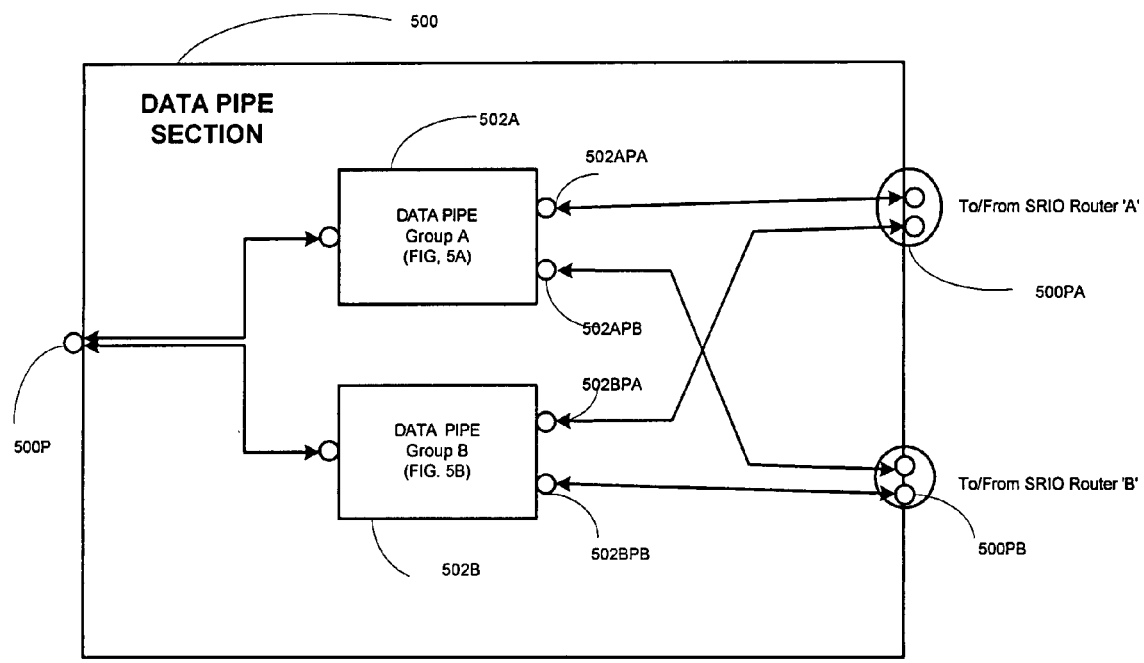
FIG. 5 is a block diagram of a data pipe section used the PCIE/SRIO protocol controller of FIG. 3 according to the invention.
Figure 5C:
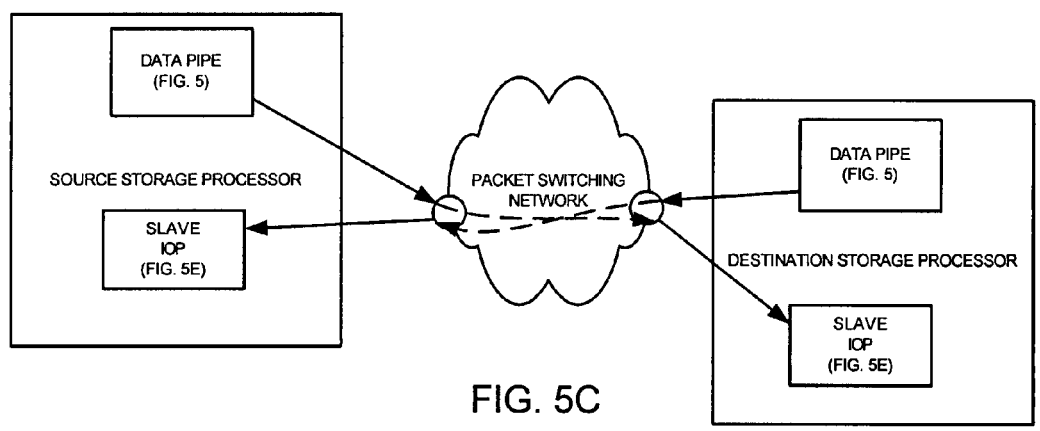
FIG. 5C is a diagram showing a pair of SPs of FIG. 2 interconnected through a packet switching network, such each of the SPs having a master data pipe section and a slave data pipe section according to the invention.

Data Pipe Section 500, FIG. 5

Referring now to the data pipe section 500, reference is made to FIG. 5. Referring again briefly to FIG. 3, the data pipe section 500 is connected to the PCIE express end point 300 via port 500P and is connected to the pair of packet switching networks 112A, 112B (FIG. 5) via ports 500PA and 500PB, respectively, through: SRIO Router "A" 902A and SRIO "A" end point 1000A; and, SRIO Router "B" 902B and SRIO "B" end point 1000B, respectively as indicated. Referring to FIG. 5, it is noted that the data pipe section 500 includes two groups of data pipes: a Group A 502A (FIG. 5A); and a group B 502B (FIG. 5B). Group A 502A is associated and controlled by request descriptors stored in a first set of four pairs of the 8 pairs of descriptor rings 213 (FIG. 2) and Group B 502B is associated and controlled by request descriptors stored in a second set of four pairs of the 8 descriptor rings 213 stored in the local/remote memory (FIG. 2). The Groups 502A and 502B are shown in detail in FIGS. 5A and 5B, respectively. As noted above, the data pipe 502 is coupled to both packet switching networks 112A and 112B. Thus, referring to FIGS. 5 and 5A, group 502A has a pair of ports 502APA and 502APB and referring to FIGS. 5 and 5B group 502B has a pair of ports 502BPA and 502BPB. The ports 502APA and 502BPA are connected to port 500PA of the data pipe section 500 and the ports 502APB and 502BPB are connected to port 500PB of the data pipe section 500. Thus, each one of the two Groups 502A, 502B is connected to both SRIO Router 902A and 902B and thus to the pair of switching networks 112A, 112B through the SRIO end points 1000A and 1000B, as indicated in FIG. 3.

Figure 5A:
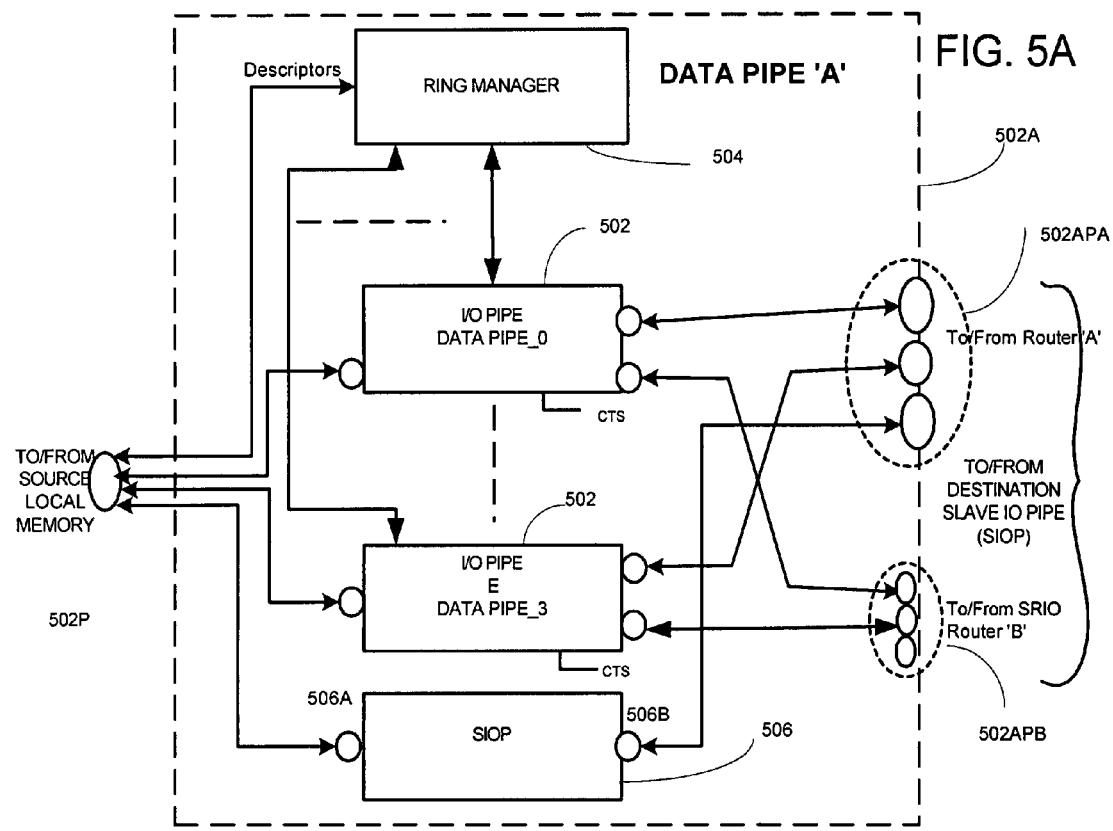
FIG. 5A is a block diagram of an exemplary one of a pair of data pipe groups used in the data pipe section of FIG. 5 according to the invention.

Referring now to FIG. 5A, the Group A 502A data pipe section includes a ring manager (i.e., data pipe controller) 504, here a microprocessor programmed as described in detail in the above referenced pending U.S. patent application Ser. No. 11/769,744. Each one of the data pipes 502 is configured in accordance with request descriptors retrieved by the ring manager 504 from the associated one of the pair of 4 descriptors rings 213; such descriptor being generated by a corresponding one of the CPUs 206 (FIG. 1) in the CPU section 204 and stored in the corresponding one of the request descriptor rings 215. It is noted that the ring manager 504 communicates with each one of the four data pipes 502 and that each one of the four data pipes 502 is connected via ports 502APA and 502APB to through both SRIO Router 902A and SRIO Router 902B to both packet switching networks 112A. 112B. On the other hand, the SIOP 506 is connected to only port 502APA and hence to only one of the packet switching networks, here packet switching network 112A.

Referring now to FIG. 5B, the Group B 502B data pipe section includes a ring manager 504; a Slave I/O Pipe (SIOP) 506 and a plurality of, here 4, parallel connected data pipes 502. Each one of the data pipes 502 is configured in accordance with request descriptors retrieved by the ring manager 504 from the associated one of the pair of 4 request descriptors rings 215; such descriptor being generated by a corresponding one of the CPUs 206 (FIG. 1) in the CPU section 204 and stored in the corresponding one of the request descriptor rings 215. It is noted that the ring manager 504 communicates with each one of the four data pipes 502 and that each one of the four data pipes 502 is connected via ports 502APA and 502APB to through both SRIO Router 902A and SRIO Router 902B to both packet switching networks 112A. 112B. On the other hand, the SIOP 506 is connected to only port 502BPA and hence to only one of the packet switching networks; here packet switching network 112B. Thus, the SIOP 506 in group A 502A is connected to only one of the pair of switching networks, here network 112A while the SIOP 506 in group B 502B is connected to only to the other one of the pair of switching networks, here network 112B.

Traditional producer/consumer rings are used to facilitate all user data transfers through the PCIE/SRIO Controller 212, (FIG. 2). The producer/consumer ring model allows the ring manager 504 (FIGS. 5A and 5B) to provide an abstraction layer between the CPU section 204 (FIG. 2) and the lower level control in the state machines of the data pipes 502 (FIGS. 5A and 5B). This allows the CPU section 204 to not worry about the intricate details of programming and managing the data pipes for user data movement.

All user data transfers are executed by one of eight master data pipes, i.e., the four I/O data pipes 502 in group A 502A and 502B. The ring manager 504 selects an available data pipe and then programs and enables it to transfer user data to/from PCIE Express Endpoint 300 to/from one or SRIO endpoints 1000A, 1000B.

The attributes of a user data transfer are fully described by the fields contained within a request descriptor. Typical attributes contained in a descriptor needed by the data pipe to move user data, include source address, destination address, transfer length count, transfer direction, and CRC protection control.

Each request descriptor produced by the CPU Section 204 in FIG. 2, has a corresponding response descriptor produced by the ring manager 504 once a user data transfer or "IO" has completed. This response descriptor typically displays status information of the user data transfer and is placed on a response ring in local memory by the ring manager.

The data pipes 502 are described in detail in the above referenced pending U.S. patent application Ser. No. 11/769, 744, As described therein, descriptors retrieved by the ring manager 504 (described in detail in the above referenced pending U.S. patent application Ser. No. 11/769,744) contain data pipe control configuration which is extracted and stored in a register array in an IO Data Pipe Manager 510. These descriptors generate control signals for the data pipe 502. More particularly, the fields of the descriptor are loaded into a register array in the 10 manager 510 to thereby configure the data pipe 502 by enabling certain features (such as XOR accumulation) described in detail in the above referenced pending U.S. patent application Ser. No. 11/769,744.

The overall flowchart of the operation of the ring manager 504, FIG. 5A or 5B is described in detail in the above referenced pending U.S. patent application Ser. No. 11/769,744. In summary, the CPU section places descriptors on one or more of the request rings 215 (FIG. 2) and updates the producer index register in the Ring Manager. Next, the ring manager 504 determines which request ring to service next using a run-list generated from a dynamic prioritization algorithm. The ring manager 504 then finds (i.e., selects) a free one of the data pipes 502 and fetches a descriptor from a request ring. Next, the ring manager 504 examines the request descriptor and programs the desired configuration through the data pipe manager 510 in the selected data pipe. Next, the ring manager 504 oversees the data transfer operated on by the selected data pipe 502 and reprograms the selected data pipe 502 via the program manager 510 as required to complete the entire data transfer. Next, when the data transfer is complete, the ring manager 504 collects status information from the selected data pipe 504 and places a descriptor on a response ring 215 (FIG. 2).

The ring manager 504 determines the next active request ring 215, based on the output of a scheduling process described in U.S. Pat. No. 7,178,146, the subject matter thereof being incorporated herein by reference, see FIGS. 5G and 5I. More particularly, the ring manager 504 fetches a request descriptor from a request ring 215 based on pre-computed run-list which is computed based on ring priority and a fairness scheme. Once the ring manager consumes the request descriptor from the request ring 215, the ring manager 504 will update the consumer index (CI) for the request ring 215 that sourced the request descriptor, the ring manager 504 parses the fetched descriptor and determines whether there is an available data pipe to use at this time. More particularly, the ring manager 504 logically parses the contents of the descriptor and checks it for possible errors. If the descriptor is logically correct, the ring manager 504 proceeds to create a data structure in its local data RAM, not shown, to control the data transfer on the data pipe including formatting the contents to be programmed to the data pipe.

Next, the ring manager 504 (FIGS. 5A, 5B) generates a data pipe configuration (e.g., source address, destination address, transfer length) from the fetched descriptor and programs this to an available data pipe 502. The ring manager then enables the data pipe 502 for operation. Thus, the ring manager 504 then finds a free data pipe 502 and programs the IO Data Pipe Manager 510 in the data pipe 502 with the pre-formatted contents previously described. It then enables the pipe for operation.

Still more particularly, the process begins by an initialization and configuration wherein the ring manager 504 is reset, and the request ring 215 (FIG. 2) is initialized. During this initialization of configuration, an arbitration process generates a run list; i.e., prioritizes the request ring 215 (FIG. 2). As described in U.S. Pat. No. 7,178,146, the entire contents thereof being incorporated herein by reference, each task to be executed is determined by a count representing the number of times out of the total run list each task is considered for scheduling. The total run list is the sum of all the counts for all tasks. Each time a task starts, exits, or has its count reset, the total number of counts is computed and tasks are distributed throughout the run list. Each task is distributed in the run list in accordance with its number of counts such that a minimum number of intervening tasks appear between each successive appearance of the same task. The computed run list is then used by a scheduler program in the ring manager 504.

During the initial configurations process, the request and response descriptor rings 217 (FIG. 2) in the local/remote memory are initialized by the CPU section in accordance with a system level program defined by the system interface. Next, the run list is generated by the ring manager 504 in generally accordance with the above described in U.S. Pat. No. 7,178,146. After the run list is generated, the initialization and configuration process is completed.

When the producer index (PI) is greater than the consumer index (CI), the ring manager 504 (FIGS. 5A, 5B) fetches a descriptor from a request ring 215 (FIG. 2) pointed to by the prioritized run list. First, the ring manager 504 determines where an IO slot is available. If it is available, the ring manager 504 (FIGS. 5A, 5B) reads the current ring number or ring ID from the runlist. Then, if the ring is enabled, and the ring is empty; the runlist ring pointer is incremented. In the other hand, if the ring is not empty, and if there is room for a response on the response ring 217 (FIG. 2), the ring manager 504 fetches an IO request descriptor from the local memory.

The descriptor is read from the request descriptor ring 215 (FIG. 2) in the local/remote memory. The ring manager 504 first determines if there is a descriptor available in its local buffer. If there is a descriptor ready, the ring manager 504 then determines whether there are any available I/O data pipes 502. When a data pipe 502 is available and after the read descriptor is ready, the ring manager 504 reads in the descriptor and updates the request descriptor ring 215 (FIG. 2) consumer index (CI). Next, the ring manager 504 logically parses the request descriptor ring 215 (FIG. 2) for common programming errors. Next, if any errors are detected in the parsing stage, the ring manager 504 immediately generates a response descriptor and places it on the response ring 217 (FIG. 2) to terminate the IO (i.e., the user data transfer). If there are no errors, the ring manager checks the SYNC bit in the descriptor. If the SYNC bit is set, the ring manager needs to ensure that descriptors fetched from the request ring 215 (FIG. 2) are executed coherently. In other words, the ring manager needs to ensure that all fetched request descriptors are executed completely before the next descriptor is fetched and dispatched to a data pipe 502.

The ring manager 504 binds the control configuration in the descriptor to the available one of the, here for example, four I/O data pipes. More particularly, the ring manager 504 finds the next ready or available data pipe, it being recognized that while all I/O data pipes 502 are initially available, since each of the I/O data pipes pass user data packet to the packet switching networks at different rates depending on the number of user data packets being buffered in the different ones of the here I/O data pipes 502, different ones of the data pipes 502 may be available at different times. In any event, the available data pipe 502 having the user data packet is configured in accordance with descriptors in the ring manager 504 associated with the user data packet and the data pipe 502 processes the user data packet through the data pipe 502 as such data pipe 502 is configured by the descriptor in the ring manger 504.

Once the data pipe 502 has processed the user data transfer, the ring manager 504 builds a response descriptor and sends the built response descriptor to the response descriptor ring 217 (FIG. 2) in the local/remote memory of the source storage processor 108. The CPU section is notified of the new response when the ring manager 504 updates the response ring producer index via a memory write to local memory. The user data transfer through the data pipe 502 is now complete.

Next, the ring manager 504 determines by examining the retrieved descriptor whether the descriptor is a scatter-gather (SGL) descriptor. If not, the ring manager 504 services the next descriptor in accordance with the above-described prioritization from the descriptor rings for use by the available data pipe 502.

On the other hand, if the retrieved descriptor is an SGL, the ring manager 504 must gather the portions making up the 10 transfer from the various memory regions in the local memory. More particularly, the ring manager 504 is responsible for managing the execution order of entries along each linked list. Each SGL entry can be treated a sub-transfer, where the data pipe moves one of the scatter-gather blocks from source to destination. Each SGL entry sub-transfer requires the data pipe to be programmed with a new data pipe configuration. The sum of all SGL entry transfer lengths equals the total transfer length count defined in the overall TLC field as shown in the SGL Request Descriptor, see FIG. 5S. A response descriptor for an SGL user data transfer will not be generated by the ring manager 504 until all entries in the linked list are complete.

More particularly, the ring manager 504 prefetches the SGL entry. More particularly, a ping pong buffer management process is used to prefetch SGL Entries from the linked list. Once an SGL Entry is being executed by a data pipe, the ring manager 504 prefetches the next linked SGL entry such that it is ready for execution when the data pipe completes the current SGL entry.

Next, the ring manager 504 processes the prefetched SGL request entry. The ring manger 504 reads the prefetched SGL entry from its local prefetch buffer within in the ring manager 504. It then logically parses the SGL entry for common programming errors, and flags any errors in the entry. If any errors are found the ring manager 504 generates an error response descriptor and places it on the response ring 215 (FIG. 2) to terminate the 10 (i.e., user data transfer).

Initially work on the rings 215, 217 (FIG. 2) are assigned to free I/O data pipes is ascending fashion until all pipes are busy. There are four data pipes assigned to each Ring Manager 504. Data Pipe_0 (FIG. 5A) in this example is executing a SGL linked list. Data Pipe_1 is executing a RAID SGL linked list and Data Pipe_2 are executing an FDMA descriptor. If all other data pipes are busy, the next data pipe assigned would be Data Pipe_3. The ring manager 504 then wait until one of the four pipes 502 becomes free. If for example data pipe_2 becomes free first, the ring manager 504 would assign the next descriptor to this data pipe.

Note there are two variations of SGL Descriptors, SGL IO and SGL RAID, see FIG. 5S.

An SGL RAID is similar to an SGL IO in that it performs scatter-gather operations, in the case of RAID, it performs a scatter gather RAID-XOR operations on scattered raid packets from local memory. For a RAID SGL, there are also SGL entries but the format is different, hence it is called a RAID SGL entry. For SGL RAID, there is an extra prefetch step which involves reading a RAID Source Array Packet from local memory. The raid source array contains up to 15 source addresses, and 15 LBA fields.

Next, when the user data transfer completes (FDMA or SGL) the data pipe 502 sends a done interrupt to the ring manager 504. The ring manager 504 then re-connects with the data pipe 502, collects status of the user data transfer. The ring manager 504 then produces a response descriptor transfers it to the response ring 217 (FIG. 2), and updates the response ring 217 (FIG. 2) producer index. The CPU Section will eventually remove this response descriptor and update its consumer index to complete the IO operation.

The data pipe 502 is now configured in accordance with the retrieved descriptor for processing the user data from the host computer/server to one or both packet switching networks.

Normally, when a packet request is launched from a data pipe a packet response including Sequence ID is returned from the receiving node back to the data pipe which initiated the request. In the event of fabric error or failure, the data pipe encounters a fatal error and the data pipe 502 generates an error interrupt to the Ring Manager 504 before shutting itself off (i.e. the current pipe operation is aborted and the pipe is left in a initialized state awaiting a reprogram for the next operation).

Typically when the ring manager 504 generates a response descriptor for a known good IO (i.e., data transfer), it frees the data pipe 502 for next request descriptor. In the case of a fatal data pipe error or descriptor timeout, the ring manager 504 generates the appropriate error responses and places them on the response ring 217 (FIG. 2). For this case, where the pipe 502 is shutdown before it finishes the programmed operation (and possibly while RIO packets are still outstanding in the fabric, so-called "orphan" packets belonging to the IO user data transfer) its not safe to reprogram the data pipe for the next operation. In other words, there is a window of time where it is possible for these "orphan" RIO packets from the previously programmed data pipe 502 operation (i.e., the transfer that encountered a fatal error) to return to the same data pipe after the fatal error occurs. If the data pipe has subsequently been re-used for a new IO by the ring manager during this time, packet sequence errors (or possibly data corruption) may occur (due to intermix of response packets from the previous and current operation arriving back at the same pipe). The method used here to recover is to retire the pipe for a period of time to allow all the "orphan" packets to return from the fabric (and be directed to the error ring 224 (FIG. 2)). This mechanism implemented is called Pipe Retirement. The ring manager 504 will not use the pipe until pipe retirement time expires. A pipe retirement time is selectable by programming a Pipe Retirement Seed register, not shown, in the ring manager 504 (FIG. 5A).

Figure 4:
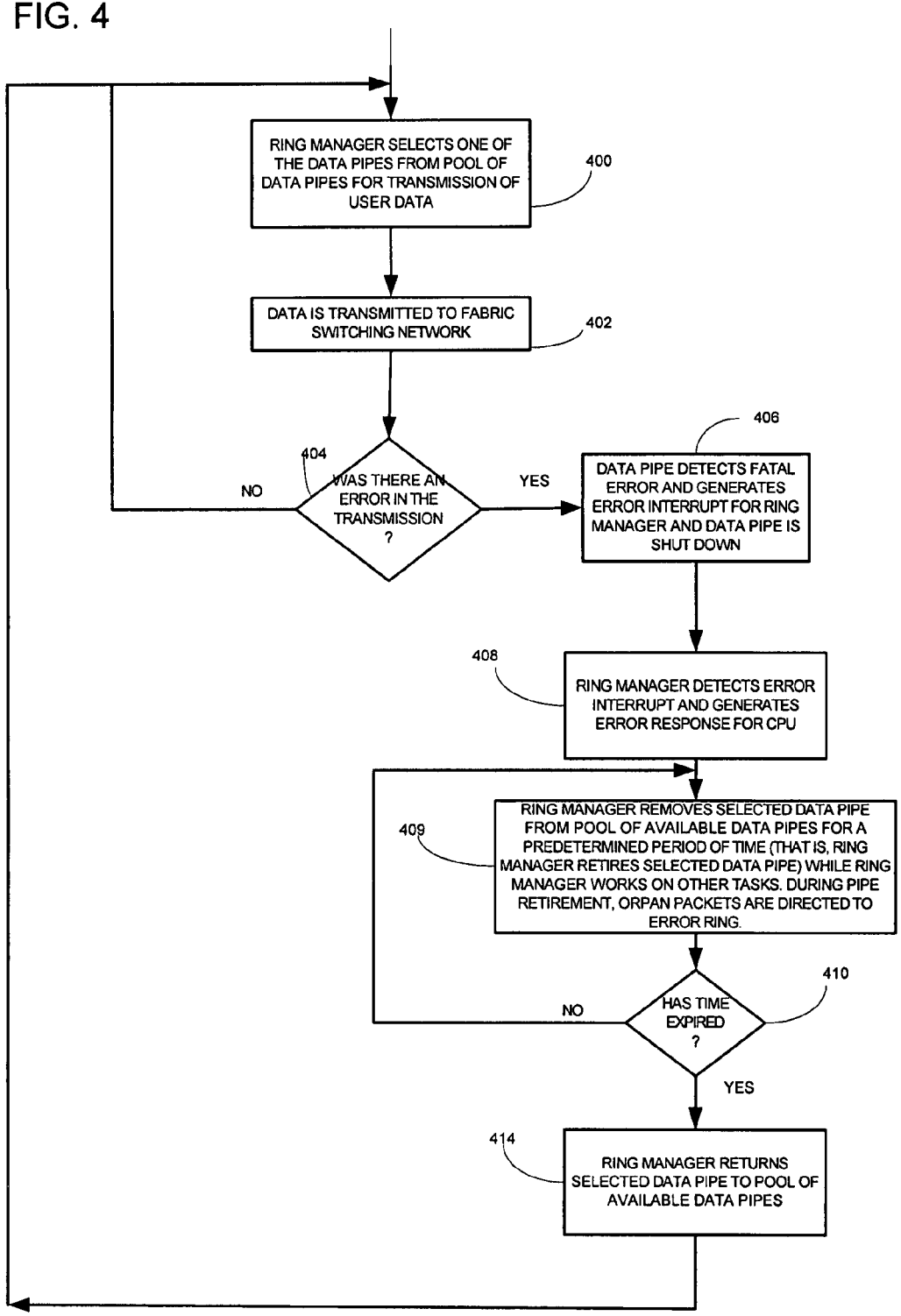
FIG. 4 is a flow chart of a process used to retire a data pipe used in the storage processor (SP) of FIG. 2 according to the invention.

More particularly, referring to FIG. 4, the ring manager 504 selects one of the data pipes 502 from the pool of data pipes for transmission of user data, Step 400. The data is transmitted from the selected one of the data pipes 504 to one or both of the packet switching networks 112A, 112b, Step 402. The data pipe 504 detects whether there was an error in the transmission, Step 404. If there was no error, the method returns to Step 400; on the other hand, if there was an error detected, the data pipe generates an error interrupt for the ring manager 504 and data pipe is shut down, Step 406. The ring manager 504 detects the error interrupt and generates an error interrupt for the CPU 206, Step 408. The ring manager 504 removes the selected one of the data pipes 502 for a predetermined period of time while the ring manager continues to work on other tasks, (i.e., the selected data pipe is retired), Steps 409, 410 until the time has expired. When the time has expired, the ring manager 504 returns the selected data pipe to the pool of available data pipes, Step 414.

A number of embodiments of the invention have been described. Nevertheless, it will be understood that various modifications may be made without departing from the spirit and scope of the invention. For example, while the PCIE/SRIO Controller 212 (FIG. 2) has been described for use with Intel or Power PC CPU, the PCIE/SRIO Controller may be used with other types of CPUs. Accordingly, other embodiments are within the scope of the following claims.

What is claimed is:

1. A method for transmitting user data from a selected one of a plurality of data pipes, comprising:
providing a controller for managing a plurality of data pipes such managing including selecting under control of the controller, one of the data pipes from a pool of the data pipes for transmission of the user data;
transmitting from the selected one of the data pipes the user data;
detecting whether there was an error in the transmission;
if there an error detected, generating in the selected one of the data pipes an error interrupt for the controller;
removing, under control of the controller, the selected one of the data pipes from the pool of data pipes for a predetermined period of time and when the time has expired, having the controller return the selected data pipe to the pool of available data pipes.

2. A method for controlling user data transmission data between a host computer/server and a bank of disk drives through a system interface, such system interface having: a plurality of storage processors, one portion of the storage processors having a user data port coupled to the host computer/server and another portion of the storage processors having a user data port coupled to the bank of disk drives; and, a packet switching network coupled to the plurality of storage processors for passing packets between the plurality storage processors, each one of the plurality of storage processors comprising: a CPU section; a data pipe section coupled between the user data port and the packet switching network, such data pipe section comprising: a plurality of data pipes, and a ring manager responsive to descriptors produced by the CPU section for controlling the plurality of data pipes, user data at the user data port passing through the data pipes, each one of the plurality of data pipes comprising a pool of available data pipes controlled by the ring manager, such method, comprising:
selecting, under control of the ring manager, one of the data pipes from the pool of data pipes for transmission of the user data;
transmitting the user data from the selected one of the data pipes;
detecting in the selected one of the data pipes whether there was an error in the transmission;
if there an error detected, generating in the selected one of the data pipes an error interrupt for the ring manager;
detecting in the ring manager the error interrupt and generating in the ring manager an error interrupt for the CPU;
removing, under control of the ring manager, the selected one of the data pipes from the pool of data pipes for a predetermined period of time while the ring manager continues to work on other tasks until the time has expired;
when the time has expired, returning, under control of the ring manager, the selected data pipes to the pool of available data pipes.

3. The method recited in claim 2 wherein when the ring manager detects the error interrupt the ring manger generates an error interrupt for the CPU.

4. The method recited in claim 1 wherein the removing, under control of the controller, the selected one of the data pipes from the pool of data pipes for a predetermined period of time and when the time has expired, having the controller return the selected data pipe to the pool of available data pipes includes the controller also managing operation of non-removed ones of the data pipes during the predetermined period of time.

5. The method recited in claim 2 wherein the removing, under control of the ring manager, the selected one of the data pipes from the pool of data pipes for a predetermined period of time while the ring manager continues to work on other tasks until the time has expired wherein such other tasks includes managing non-selected data pipes during the predetermined period of time.

* * * * *